Patented Aug. 21, 1923.

1,465,600

UNITED STATES PATENT OFFICE.

BYRON E. ELDRED, OF LONG ISLAND CITY, NEW YORK, ASSIGNOR, BY MESNE ASSIGNMENTS, TO CARBIDE AND CARBON CHEMICALS CORPORATION, A CORPORATION OF NEW YORK.

PROCESS OF SEPARATING OLEFINES FROM GASEOUS MIXTURES.

No Drawing.   Application filed January 18, 1918.   Serial No. 212,429.

*To all whom it may concern:*

Be it known that I, BYRON E. ELDRED, a citizen of the United States, residing at Long Island City, county of Queens, and State of New York, have invented certain new and useful Improvements in Processes of Separating Olefines from Gaseous Mixtures, fully described and represented in the following specification.

The object of my invention is the production, from an olefin-containing gaseous mixture (such, for example, as is readily obtainable from the cracking of a petroleum product, such as fuel oil or crude kerosene), of a gas containing a substantially higher percentage of the olefines, or a substantially higher percentage of the particular olefin desired, than is obtainable by the known methods of cracking such products to produce a mixture of hydrocarbons of the olefin series and saturated hydrocarbons. My invention also has for a more specific object the production from such petroleum products of a substantially pure olefin, particularly ethylene and propylene, or a mixed gas containing so large a proportion of such olefin that the subsequent treatment thereof to produce useful products will present practically none of the difficulties heretofore attending the manufacture of such products and their subsequent purification. My invention has, also, other objects and advantages, as is hereinafter fully explained.

When cracking crude kerosene at a suitable temperature to produce these olefines to best advantage, it is found possible to secure a mixed gas containing as high as approximately fifty per cent. of ethylene, propylene and butylene combined. After cracking the oil the olefin-containing gas must be removed quickly, protected by a fog of unchanged oil, to insure against a further breaking down. By cracking at a relatively high suitable temperature the olefines resulting will comprise a higher percentage of ethylene, while by cracking at a relatively low suitable temperature it is possible to produce a gas whose olefine content is mainly propylene. Where the olefin content is mainly propylene a small percentage of butylene will be formed, which decreases proportionately as the percentage of ethylene increases and the percentage of propylene decreases. If it is desired to produce ethylene to the practical exclusion of propylene a high heat is required, together with a practically instantaneous removal from the high heat zone of the cracking device; the propylene formed apparently breaking down to ethylene, while there may be considerable acetylene formed.

In all of these processes, however, the olefines are so highly diluted with saturated hydrocarbons that their subsequent treatment to produce useful products presents difficulties of more or less gravity dependent on the nature of such treatment. Thus, in some processes of treating the mixed gas with the object of producing dihalids or chlorhydrins of the olefines, the saturated hydrocarbons are inevitably to some extent halogenated, resulting in an impure product and necessitating subsequent treatment for purification. It is also obvious that in any treatment for the manufacture of dihalids or chlorhydrins the capacity of the reaction apparatus decreases proportionately to the content of diluent gases. It is also apparent that there is more or less waste of the halogenating reagent. Further, the saturated hydrocarbons leaving the reaction chambers and condensers following carry more or less of the products sought, which are thus wasted. This, of course, involves a contamination of the saturated hydrocarbons themselves, which, freed from the products that they thus carry off, would often be more available for practical use.

In carrying out my process I take a gaseous mixture which has been produced from oil gas or any suitable source by any suitable cracking operation and containing any assumed content of olefines and compress it by any suitable means. The ordinary two stage compressor may be utilized for this purpose. A pressure of 150 pounds is found suitable, although the successful practice of the process is not dependent upon the degree of compression specified. The gas, maintained under pressure, is brought into contact with, or is compressed in the presence of, a suitable absorbent liquid, preferably gas naphtha (so called in the trade), which is the resultant liquid obtained from the compression of cracked oils. The greater the surface presented by the absorbent liquid, the more readily will it absorb the gases under pressure exposed to it.

I have discovered not merely that the gas naphtha so employed provides an excellent solvent for the olefines of the mixed hydrocarbon gas above specified, but that it absorbs propylene to a greater extent than ethylene and ethylene to a greater extent than the saturated hydrocarbons. Hence, when the gas naphtha is drawn off and the pressure relieved so that the gas absorbed by the gas naphtha is gradually given off, the olefin content of such gas is found to be very much in excess of the olefin content of the original gas, and while the percentage of ethylene relative to saturated hydrocarbons has been increased, its percentage relative to the propylene has been very much reduced. In fact, the propylene content of the evolved gas is so high that, after a single compression and absorption treatment as above described, the gas is available for use in the manufacture of certain products of which propylene is an important constituent. However, if it is desired to obtain an approximately pure propylene, it is only necessary to subject the gas evolved from the gas naphtha after the first compression and absorption treatment to one or more similar treatments, the result of which will be to absorb propylene to almost the complete exclusion of the other constituent gases, including the ethylene as well as the saturated hydrocarbons.

It is true that butylene and the higher olefines are also readily absorbed by the gas naphtha, but these hydrocarbons are present in relatively small proportions and they may be removed by subjecting the mixed gas to a 50 per cent $H_2SO_4$ water solution of such acid of specific gravity of 1.84, if their removal is deemed essential or desirable. The acetylene may be absorbed by another solvent acetone, the gases being compressed and the operation proceeding in a manner similar to that hereinbefore described for the absorption of the olefines in gas naphtha. If the separation of the acetylene has not secured the desired concentration of the ethylene, the latter may be further concentrated to the extent desired by compressing the gas in the presence of gas naphtha in the manner hereinbefore described. In either event a gas is produced which is especially well adapted for subsequent use, particularly in the manufacture of halogenated ethylene products, such as ethylene chlorhydrin or Dutch liquid, which may be carried out, for example, in the manner described in my pending applications Serial No. 147,461 filed Feby. 8, 1917, and Serial No. 178,364 filed July 3, 1917.

It is obvious, too, that the process is applicable for use where the mixed hydrocarbon gases have been deprived of one of their constituents by a wholly different process. Thus, in an application filed by me July 3, 1917, Serial No. 178,364, I have set forth a process for manufacturing chlorhydrins in which the propylene of a mixed gas comprising also ethylene and saturated hydrocarbons is selectively chlorinated. The gases passing over, if subjected to my present process, may be largely deprived of their unsaturated hydrocarbons, leaving an approximately pure ethylene, or a gas unusually rich in ethylene, which, if desired, may be readily and economically chlorinated to form ethylene dichlorid or ethylene chlorhydrin, the resultant product being one of exceptional purity.

Having now fully described my invention, what I claim and desire to protect by Letters Patent is:

1. In the treatment of a gaseous mixture comprising propylene, ethylene and saturated hydrocarbons to secure the concentration of the propylene, a process which comprises subjecting said gaseous mixture under pressure to the action of an absorbent adapted to preferentially absorb the propylene and freeing absorbed gas from the absorbent thereby producing a gas having a relatively high propylene content.

2. In the treatment of a gaseous mixture comprising an olefinic constituent and a saturated hydrocarbon constituent to secure the concentration of the olefin, a process which comprises subjecting said gaseous mixture under pressure to the action of an absorbent adapted to preferentially absorb one of said constituents thereby separating out a gas having a relatively high content of the olefinic constituent, and then subjecting the last named gas to the action of an absorbent adapted to preferentially absorb the olefinic constituent to obtain a still higher concentration of the latter.

3. In the treatment of a gaseous mixture comprising an olefinic and a saturated hydrocarbon to secure the concentration of the olefin, a process which comprises subjecting said gaseous mixture under pressure to the action of an absorbent adapted to preferentially absorb the olefin and freeing absorbed gas from the absorbent and then subjecting the freed gas to one or more additional similar compression and absorption treatments to obtain a higher olefinic concentration.

4. In the treatment of a gaseous mixture comprising propylene, ethylene and saturated hydrocarbons, a process which comprises subjecting said gaseous mixture under pressure to an absorbent having a greater absorptive action upon said olefines than upon the saturated hydrocarbons and having a greater absorptive action upon propylene than upon ethylene, freeing absorbed gases from the absorbent, subjecting the unabsorbed gases to the action of a similar absorption treatment and freeing gas absorbed in the second treatment, whereby three gaseous mixtures are produced two of which have relatively high contents of propylene and ethylene respectively.

5. In the treatment of a gaseous mixture comprising an olefinic and a saturated hydrocarbon to secure the concentration of the olefine, the process which comprises subjecting said gaseous mixture under pressure to the action of gas naphtha, and freeing the absorbed gas from the gas naphtha.

6. In the treatment of a gaseous mixture comprising propylene and a saturated hydrocarbon to secure the concentration of the propylene, the process which comprises subjecting said gaseous mixture under pressure to the action of gas naphtha, and freeing the absorbed gas from the gas naphtha.

In testimony whereof, I have hereunto set my hand.

BYRON E. ELDRED.